(12) United States Patent
Moore

(10) Patent No.: US 6,463,654 B1
(45) Date of Patent: Oct. 15, 2002

(54) SCORING TOOL FOR REMOVING SHEATH FROM ELECTRICAL CABLE CONDUCTOR AND METHOD

(76) Inventor: Boyd B. Moore, 5226 Brittmore, Houston, TX (US) 77041

( * ) Notice: Subject to any disclaimer, the term of this patent is extended or adjusted under 35 U.S.C. 154(b) by 0 days.

(21) Appl. No.: 09/469,509

(22) Filed: Dec. 22, 1999

(51) Int. Cl.⁷ .............................................. H01R 43/00
(52) U.S. Cl. ......................................... 29/825; 81/9.51
(58) Field of Search ............................... 29/825; 81/9.51

(56) References Cited

U.S. PATENT DOCUMENTS

| | | |
|---|---|---|
| 880,790 A | 3/1908 | Goehst |
| 1,275,225 A | 8/1918 | Cleve |
| 2,346,227 A | 4/1944 | Martin et al. |
| 2,385,368 A | 9/1945 | Montgomery |
| 2,502,245 A | 3/1950 | Charles |
| 3,089,237 A | 5/1963 | Norton |
| 3,215,007 A | 11/1965 | Stallings |
| 3,914,864 A | 10/1975 | Prince |
| 4,955,137 A | 9/1990 | Maatthews |
| 4,972,583 A | 11/1990 | Pinchion |
| 5,301,426 A | 4/1994 | Regan |
| 5,809,652 A | 9/1998 | Ducret |

FOREIGN PATENT DOCUMENTS

| | | |
|---|---|---|
| FR | 1123431 | 9/1956 |
| GB | 637484 | 5/1950 |

*Primary Examiner*—Carl J. Arbes
(74) *Attorney, Agent, or Firm*—Fulbright & Jaworski L.L.P.

(57) ABSTRACT

A scoring tool and method are described which are useful in removing a portion of an outer lead sheath of an electrical cable conductor. The tool includes a substantially C-shaped tool for straddling the conductor and a scoring wheel supported by the frame. The tool is used to form both longitudinal and circumferential score lines in the outer surface of the sheath. A strip formed between the longitudinal score lines can be gripped, rolled up and removed. The remaining portion of the lead on either side of the score lines can then be removed.

28 Claims, 3 Drawing Sheets

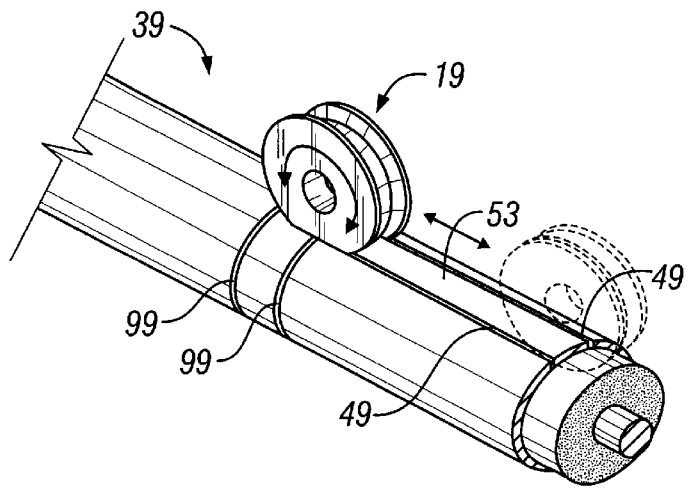
FIG. 5
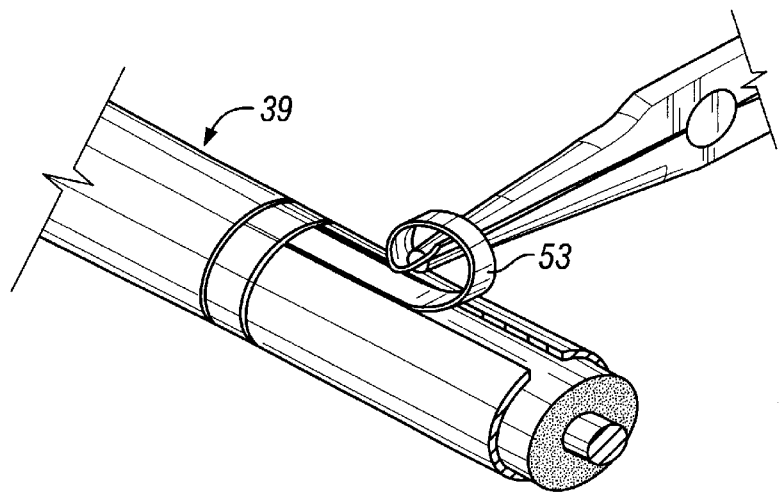
FIG. 6
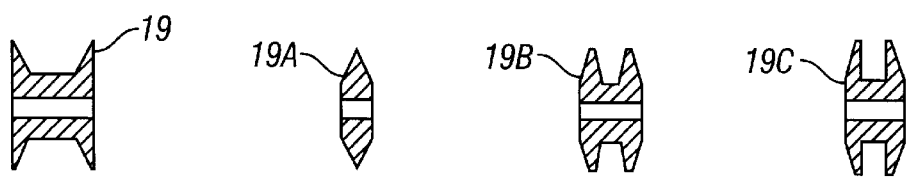
FIG. 7  FIG. 7A  FIG. 7B  FIG. 7C

SCORING TOOL FOR REMOVING SHEATH FROM ELECTRICAL CABLE CONDUCTOR AND METHOD

FIELD OF THE INVENTION

BACKGROUND OF THE INVENTION

The present invention relates generally to a hand-held scoring tool and method and, more particularly, to a tool and method for scoring an outer lead sheath of an electric cable conductor and removing the sheath after it is scored.

The tools according to the invention are usable on various electrical cable conductors, including those typically used as electricity transmission lines and lines for communicating control signals from one remote location to another, such as in downhole applications. More specifically, conductors used to transmit electricity to a downhole well tool are typically formed of three-conductor cable. An important use for these types of cables is for transmitting electricity to a submersible pump located inside the well bore through a power cable extending from an electrical source on the surface through the well bore and into the pump.

Insulation material is wrapped or extruded around each conductors, and an outer sheath of lead is typically extruded around the insulation material. The outer sheath is designed to isolate the conductor insulation from well fluids. The lead sheath has a ductility and flexibility which simplify the task of joining or splicing cables, and allows the cable to be wound on a reel. The lead sheath provides good fault carrying capabilities and acts as an effective barrier against moisture and chemicals, but does not impair the flexibility of the cable.

In the past, the lead sheath has been removed by cutting the lead in various places and then stripping it from the conductor. This crude technique has been unsatisfactory because it is time consuming and, if the lead is not cut carefully, the insulation can be cut and the conductor damaged. Thus, there is a need for a tool for removing the lead sheath in a way that is quick and easy to use in the field and does not damage the insulation or underlying conductor.

SUMMARY OF THE INVENTION

A tool and method have been developed in accordance with the invention, which are useful in removing a metallic or non-metallic outer layer or sheath, such as lead, from the outer surface of an electrical conductor. The tool and method involve scoring the outer surface of the sheath in such a way that the underlying insulation and conductor are not damaged, and then peeling the sheath from the insulated conductor.

The scoring tool includes a frame, preferably a C-shaped frame similar to that used in a pipe cutter, which straddles the electrical conductor and can be rotated about the cable for scoring the sheath. The tool has at least one scoring edge supported by the frame for engaging the outer surface of the insulated conductor when the frame straddles the conductor. The frame also includes a one or more rollers or other type of bearing surface, so that when the frame straddles the conductor, the conductor is located between the bearing surface and the scoring edge. The tool can be adjusted so that the scoring edge engages the conductor at a predetermined compressive force for creating a circumferential indentation in the outer surface of the sheath when the frame is rotated about the conductor.

The frame is also adapted to straddle the insulated conductor lengthwise, so that the frame can be moved along the length of the conductor for scoring the sheath longitudinally. This is done by forming a hole in the C-shaped frame through which the conductor can extend The tool can also be provided with a second scoring edge disposed in parallel relation with the first scoring edge, either on one scoring wheel or on two separate scoring wheels. Preferably, the tool has a handle and a low friction surface for the bearing surface, which, along with the scoring wheel, facilitate movement of the frame relative to the conductor.

The present invention is also directed to a method for removing an outer layer or sheath (e.g., a lead sheath) from an insulated electrical conductor, which includes the steps of forming a pair of parallel score lines (or longitudinal indentations) lengthwise along the outer surface of the sheath, and lifting a free end of the sheath, located between the score lines, at the end of the conductor. The portion of the sheath located between the score lines is removed by progressively pulling that portion and separating it from the remainder of the sheath at the score lines. In a variation of the inventive method, the free end is lifted and rolled up along the conductor to peel off the portion of the sheath located between the score lines. The remainder of the sheath may then be pulled away from the conductor in a direction away from the removed portion.

The method may also include the step of forming at least one circumferentially extending score line around the sheath. This step may be performed prior to or after forming the pair of parallel score lines. In either case, the pair of longitudinal score lines end at the circumferential score line.

BRIEF DESCRIPTION OF THE DRAWINGS

The invention will be better understood when the following detailed description is considered along with the appended drawings, in which:.

FIG. 5 illustrates a scoring wheel being employed to create a longitudinally extending score line on the cable;

FIG. 6 illustrates a pair of pliers being employed to remove a longitudinal strip of an outer sheath of the cable; and FIG. 7 is a cross-sectional view of the preferred scoring wheel with a pair of scoring surfaces; and FIGS. 7A–7C are cross-sectional views of alternative scoring wheels usable with the tool in FIG. 1.

DETAILED DESCRIPTION OF EXEMPLARY EMBODIMENTS

Figure 1:
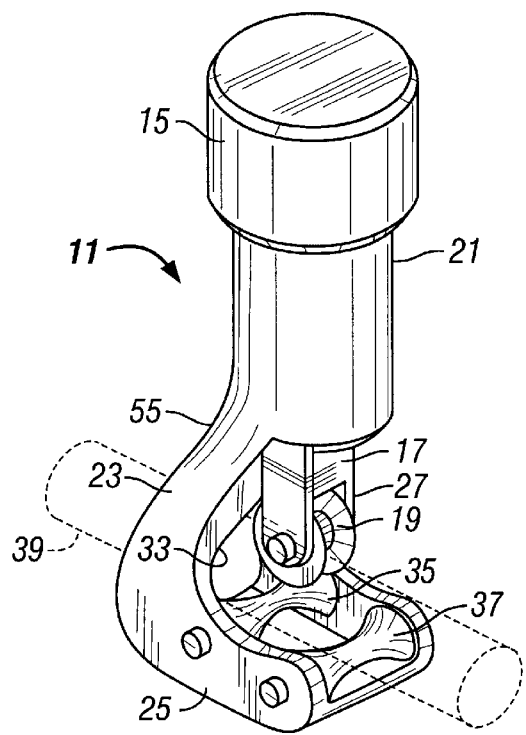
FIG. 1 is a perspective view of a hand-held tool for removing sheathing from an electrical cable, according to the invention.
Figure 2:
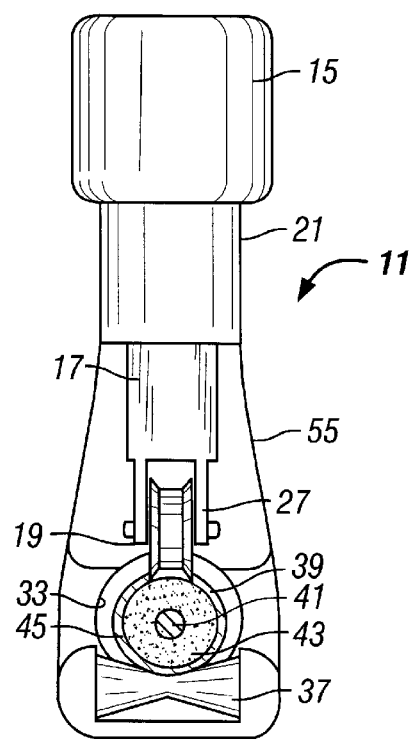
FIG. 2 is a front elevation view of the hand-held tool in FIG. 1.
Figure 4:
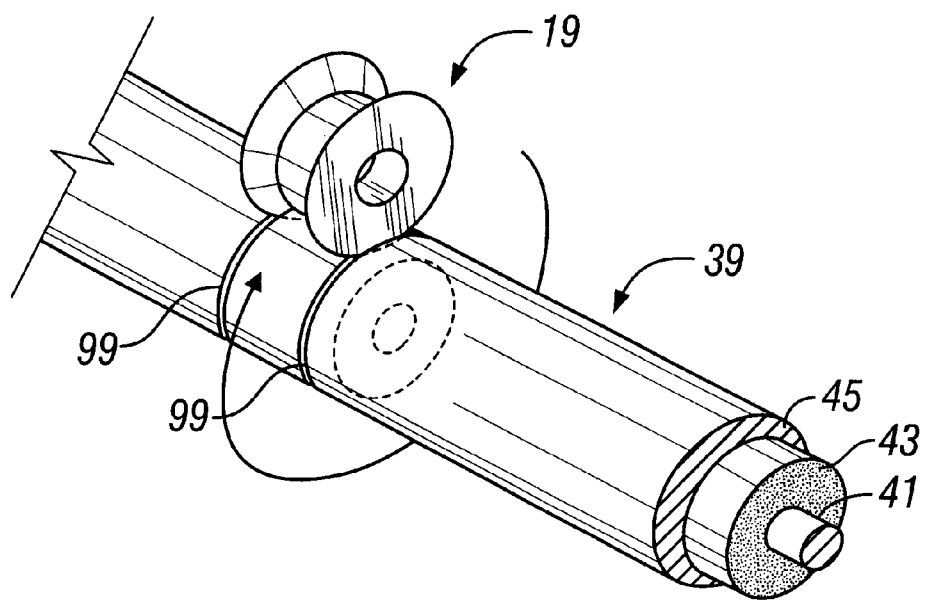
FIG. 4 illustrates a scoring wheel being employed to create a circumferentially extending score line on the cable.

As shown in FIGS. 1 and 2, a hand-held tool 11 embodying the invention is shown, which can be used in a method for removing the outer lead sheath of an electrical conductor cable 39, which typically includes an inner conductor 41, insulation 43 around the conductor, and an outer lead sheath 45. The tool 11 operates to score the lead sheath to assist in removing it from the conductor without damaging the underlying insulation or the conductor itself. FIGS. 4–6 illustrate one method of scoring and/or removing the outer sheath of the electrical conductor cable 39.

Referring to FIGS. 1 and 2, the hand-held tool 11 has a frame 13 which includes a handle 21 and a C-shaped section 55 connected to the handle 21. The C-shaped section 55 includes an intermediate section 23 and an support beam 25. The C-shaped section 55 and handle 21 define a recess that forms a space within which the tool 11 can engage an electrical conductor as discussed in greater detail below.

Figure 2A:
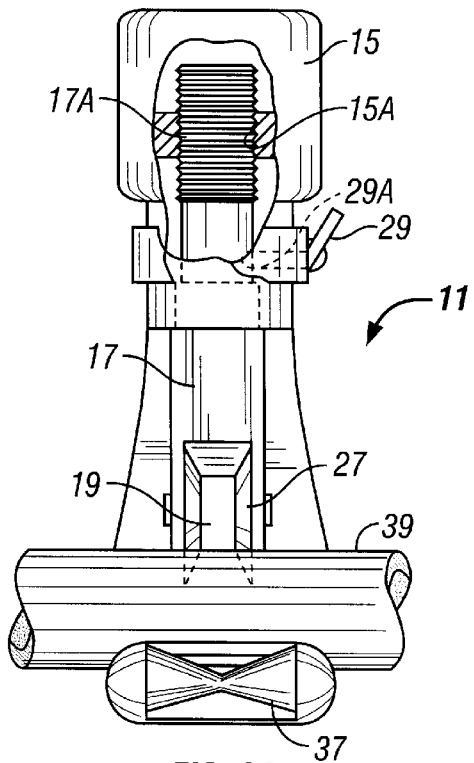
FIG. 2A is a side view of the hand-held tool engaging an electrical cable.
Figure 3:
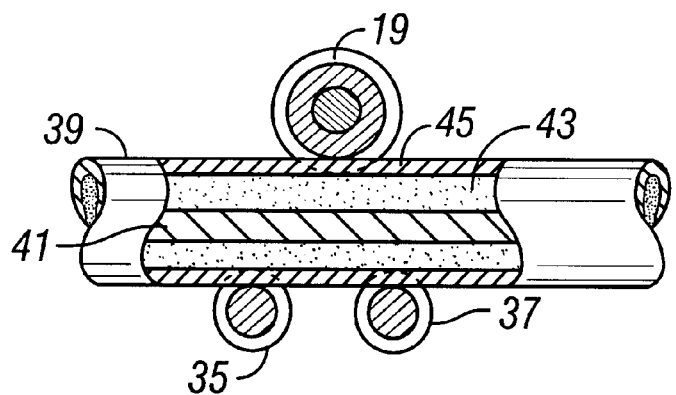
FIG. 3 is an elevational view, partially in section, of an electrical cable engaged by the hand-held tool in FIG. 1.

The handle 21 includes an adjustment hub 15, which has a center cavity 61 that receives a portion of a movable post 17, so that the post 17 and the scoring wheel 19 can be moved relative to the conductor. The movable post is partially situated in the handle 21. As best shown in FIG. 2A, the movable post 17 is equipped with outer threads 17A which engage cooperating threads 15A formed on the adjustment hub 15. When the adjustment hub 15 is rotated, the internal threads 15A of the adjustment hub 15 engage the threads 17A of the movable post 17, for transferring rotational movement of the adjustment hub 15 into linear movement of the movable post 17, as shown in FIG. 2A.

A lever mechanism or lock 29 is provided through the handle 21, which includes an inner portion 29A that is frictionally engageable with the movable post 17. The lock 29 may be rotated, e.g. one-half turn, so as to frictionally engage or lock the movable post 17 in place and prevent further movement of the post 17. Thus, when the adjustment hub 15 is sufficiently rotated to move the movable post 17 to a desired position, the lock 29 secures the movable post 17 in place.

A wheel frame 27 is formed on one end of the movable post 17, which supports a scoring wheel 19, with two cutting edges, shown in FIGS. 1–6 and 7. When the movable post 17 is moved by turning the adjustment hub 15, the scoring wheel 19 is moved in or out relative to an electrical conductor 39. As shown below, the movable post 17 may be moved so that the scoring wheel 19 engages or disengages the conductor 39 when it is positioned in the working area of the tool 11 (see e.g., FIG. 1). As also shown in FIGS. 1 and 2, the support beam 25 rotatably supports a pair of rollers 35, 37, which engage the conductor 39 opposite the scoring wheel 19.

The frame 13 is formed with a opening 33 located centrally through the neck portion 23, through which the conductor can extend. As shown in FIG. 2, the guide 33, scoring wheel 19, and the pair of rollers 35, 37 are aligned. This alignment allows the insulated electrical conductor 39 to be inserted through the cable guide 33 and disposed in between the scoring wheel 19 and the first and second rollers 35, 37, so that a pair of parallel score lines 49 can be formed longitudinally in the outer surface of the lead sheath 45, which are shown in FIGS. 4–6.

Referring to FIG. 2A, the conductor 39 may also be positioned in the working area of the tool 11, between the rollers 35, 37 (second roller 37 not shown) and scoring wheel 19, perpendicular to the longitudinal axis of the conductor. In this position, the tool 11 will form a pair of circumferential score lines 99 in the outer surface of the lead sheath 45.

The frame 13 can be constructed from a metal or hard plastic material, while the scoring wheel 19 and first and second rollers 35, 37 are preferably constructed from a metal. The movable post 17 may be constructed from a metallic material or a hard plastic. More commonly, the first and second rollers 35, 37 are machined from metal or hard plastic, and the scoring wheel 19 can be machined from a stainless steel material. Nevertheless, the material selected for the scoring wheel 19 is typically selected based on the application intended for the hand held tool 11. For example, the material of the scoring wheel 19 may be selected so as to enhance the ability of the scoring wheel 19 to penetrate the material of the outer sheath of the subject electrical conductor.

FIGS. 4–6 illustrate a method of scoring and/or removing an outer sheath 45 from electrical conductor cable 39. More particularly, the application of the method described herein, is commonly associated with a three-conductor electric power cable such as that used to transmit electricity to a downhole submersible pump.

In these downhole applications, it is common for the electrical cable to be spliced or otherwise joined with another section of electrical cable so as to repair or to extend the electrical cable. Accordingly, it is necessary to remove a portion of the lead sheath 45 on the individual conductors 39 located in the vicinity of the splice locations. It is often necessary to remove the lead sheath 45 separately from the insulation layer 43 in a manner which does not result in damage to the insulation layer 43.

As shown in FIG. 4, the tool 11 is used to score the outer sheath 45 circumferentially at the point where the lead sheath is to be removed from the end of the cable. One or more circumferential score lines 99 operate as the stopping point for the two parallel score lines 49 shown in FIG. 5. When the scoring wheel 19 has a pair of cutting edges as shown in FIGS. 4–6, dual score lines 49 and 99 are formed on the outer surface of the lead sheath 45. Although only a single circumferential score line 99 is needed, it is easier to form two so as not to have to use a different scoring wheel from the one used to form the longitudinal scoring lines 49, which create a longitudinal strip 53 between the scoring lines as shown in FIG. 5, which is easily separable from the rest of the outer sheath 45. Note that it is not necessary that the score lines 49 or 99 penetrate completely through the lead sheath 45.

The score lines 49 extend to the circumferential score lines 99. Subsequently, a pair of needle nose pliers 51 may be used to grasp and one end of the strip 53 of lead sheath and roll it up. After the strip 53 is removed from the cable, the remaining portion of the lead sheath 45 remaining on either side of the space formed by removal of the strip 53, can be removed from the insulation layer 43. The circumferential score line 99 substantially weakens the attachment of that portion of the sheath to the remaining length of the sheath 45, which allows for easy removal of that portion. The ductility of the lead sheath 45 facilitates separation of the two portions of the sheath 45.

FIGS. 7A–7C show alternative configurations of the scoring wheel 19. In FIG. 7A, a scoring wheel 19A is shown having a single cutting edge, which could be used to form a single circumferential score line 99 instead of two of them as shown in FIGS. 4–6. However, if this wheel is used for forming the longitudinal score lines 49, two passes must be made to form two of the score lines. In FIGS. 7B and 7C, alternative shapes of two-edge scoring wheels are shown. FIG. 7B shows a scoring wheel 19B with cutting edges that are beveled on both their inner and outer surfaces, and FIG. 7C shows a scoring wheel 19C where only the outer surfaces of the edges are beveled, which are different from the cutting edges for the wheel 19 in FIG. 7 where only the inner surfaces are beveled.

All of the cutting edges for the scoring wheels shown in FIGS. 7 and 7A–7C, are preferably formed with a relatively small radius on the portion that engages the sheath, so that the cutting edge is sufficiently dull to ensure that the insulation layer 43 is not accidentally damaged. Specifically, the edges are designed so that when the scoring wheel 19 scores the outer surface of the lead sheath 45, the edges will not cut into the insulation layer 43 directly below. The opposite side surfaces of the cutting edges are preferably disposed relative to other at an angle of about 15°–20°, and in particular about 15°.

The space between the cutting edges 19, 19B or 19C can be at about 0.220 inches. Each cutting edge can be formed to have a height of about 0.125 inches, with the scoring wheel 19 having a diameter of about 0.750 inches. However, other shapes and dimensions can also be used.

The foregoing description of the present invention has been presented for purposes to of illustration and description. The description is not intended to limit the invention to the form or forms disclosed herein. Consequently, variations and modifications commensurate with the above teachings, and the skill or the knowledge of the relevant art, are within the scope of the invention. The embodiments described herein are further intended to explain the best mode known for practicing the invention and to enable others skilled in the art to utilize the invention and such, or other, embodiments and with various modifications required by the particular applications or uses of the present invention. It is intended that the appended claims be construed to include alternative embodiments to the extent that is permitted by the prior art.

What is claimed is:

1. A method for removing an outer lead sheath from an electrical cable condutor, the method comprising the steps of:
   a) forming at least one circumferentially extending score line around the sheath;
   b) forming a pair of parallel score lines simultaneously and extending the score lines lengthwise along the outer surface of the sheath up to the circumferentially extending score line;
   c) lifting a section of the sheath located between the score lines away from the conductor to create a free end;
   d) removing a portion of the sheath located between the score lines by lifting the free end and progressively pulling said portion and separating it from the remainder of the sheath at the score lines; and
   e) peeling the remainder of the sheath away from the conductor in a direction away from the removed portion.

2. The method of claim 1, wherein the step of removing includes the step of lifting the free end and winding it along the conductor to peel off the portion of the sheath located between the score lines.

3. The method of claim 1, wherein the step of forming a pair of parallel score lines is performed by forming the score lines simultaneously.

4. A scoring tool usable in removing an outer sheath of an electrical cable conductor, said tool comprising:
   a frame shaped to straddle, at least partially, the conductor such that said frame is movable relative to the conductor, said frame having a handle for moving the tool relative to the conductor;
   a moveable post longitudinally positioned within said handle, said post having a scoring end portion;
   a scoring edge supported by said scoring end portion, said edge disposed, when said frame straddles the conductor, in position to engage the conductor, wherein said scoring edge is rotatably mounted at said scoring end portion; and
   a bearing surface supported by said frame such that, when said frame straddles the conductor, the conductor is disposed substantially in between said bearing surface and said scoring edge; and
   wherein at least one of said scoring edge and said bearing surface is movable toward the other of said scoring edge and said bearing surface such that, when said frame straddles the conductor, the scoring edge engages the conductor at a predetermined compressive force and creates an elongated indentation on the sheath when said frame is moved relative to the conductor.

5. The scoring tool of claim 4, wherein said frame is adapted to straddle the conductor in a first position relative to the conductor, such that said frame may be moved along the longitudinal length of the conductor such that the engagement of said scoring edge with the conductor creates a longitudinally extending indentation on the sheath.

6. The scoring tool of claim 5, wherein said frame is adapted to straddle the conductor in a second position relative to the cable, such that said frame may be moved circumferentially about the conductor and such that the engagement of said scoring edge with the conductor creates a circumferentially extending indentation on the sheath.

7. The scoring tool of claim 4, further comprising a scoring wheel supported by said frame, said scoring wheel including said scoring edge.

8. The scoring tool of claim 4, wherein said frame includes a substantially C-shape section that partially defines a conductor working space, wherein a portion of the conductor is positioned in said conductor working space when said frame straddles the conductor, such that said scoring edge is engageable with the conductor portion.

9. The scoring tool of claim 8, wherein said substantially C-shaped section includes a first end and a second end, said scoring edge being supported adjacent said first end and said bearing surface being supported adjacent said second end.

10. The scoring tool of claim 9, wherein said substantially C-shaped section includes an opening through which one end of the conductor may be inserted, said opening being disposed intermediate said first end and said second end and having a longitudinal centerline that intersects said working space such that the conductor may be positioned into said working space from said opening.

11. The scoring tool of claim 10, wherein said substantially C-shaped section is adapted to straddle the conductor in a first position relative to the conductor such that a longitudinal length of the conductor may be moved through said opening while said scoring edge engages the conductor, and wherein said substantially C-shaped section is adapted to straddle the conductor in a second position such that said scoring edge may be moved circumferentially about to the conductor while engaging the conductor, said first position being about ninety degrees from the second position.

12. The scoring tool of claim 11, further comprising a pair of rollers including said bearing surface, said pairs of rollers being positioned relative to the conductor, when said substantially C-shaped section straddles the conductor, such that said rollers are rotatable against the conductor when the scoring edge is moved circumferentially about the conductor.

13. The scoring tool of claim 10, wherein said substantially C-shaped section is adapted to straddle the conductor such that a longitudinal length of the conductor may be moved through said opening while said scoring edge engages the conductor.

14. The scoring tool of claim 10, further comprising at least one roller that includes said bearing surface, said roller being positioned relative to the conductor, when said substantially C-shaped section straddles the conductor, such that said roller is rotatable against the conductor when a longitudinal length of the conductor is moved through said opening.

15. The scoring tool of claim 4, further comprising at least one roller that includes said bearing surface.

16. The scoring tool of claim 15, further comprising a second roller that includes a second bearing surface.

17. The scoring tool of claim 4, wherein said bearing surface includes a low friction surface supported by said frame.

18. The scoring tool of claim 4, further comprising a second scoring edge disposed in parallel relation with the first scoring edge.

19. The scoring tool of claim 4, wherein said frame includes a substantially curved section having a first end and a second end, said scoring edge being supported adjacent said first end and said bearing surface being supported adjacent said second end.

20. The scoring tool of claim 4, wherein said handle has a lock element engageable with said moveable post.

21. The scoring tool of claim 4, further comprising an adjustment hub engaged with said moveable post.

22. A scoring tool usable in removing an outer sheath of an electrical conductor cable, said tool comprising:

a frame including section that is at least partially curved to define a working space and adapted to straddle the conductor such that a portion of the conductor is positioned in said working space, said curved section including:
a first end,
a second end, and
an opening disposed intermediate said first and second ends, and having a longitudinal centerline that intersects said working space, such that one end of the conductor may be inserted through said opening and into said working space, said frame having a handle for moving the tool relative to the conductor;

a moveable post longitudinally positioned within said handle, said post having a scoring end portion;

a scoring wheel supported by said scoring end portion, said wheel adjacent said first end and having a scoring edge disposed, when said frame straddles the conductor, in position to engage the portion of the conductor positioned in said conductor working space when said frame straddles the conductor; and a bearing surface supported by said frame such that, when said frame straddles the conductor, the conductor portion is disposed substantially in between said bearing surface and said scoring edge; and wherein, at least one of said scoring edge and said bearing surface is movable toward the other of said scoring edge and said bearing surface such that, when said frame straddles the conductor, the scoring edge engages the conductor at a predetermined compressive force and creates an indentation on the lead sheath.

23. The scoring tool of claim 22, wherein said curved section is substantially C-shaped, said substantially C-shaped section being adapted to straddle the conductor in a first position relative to the conductor such that a longitudinal length of the conductor may be moved through said opening while said scoring edge engages the conductor.

24. The scoring tool of claim 23, wherein said substantially C-shaped section is adapted to straddle the conductor in a second position while said scoring edge is engaged with the conductor such that said scoring edge may be moved circumferentially about the conductor, said first position being about ninety degrees from the second position.

25. The scoring tool of claim 24, further comprising a pair of rollers including said bearing surface, said pair of rollers being positioned relative to the conductor, when said substantially C-shaped section straddles the conductor, such that said rollers are rotatable against the conductor when said scoring edge is moved relative to the conductor.

26. The scoring tool of claim 25, further comprising a second scoring edge disposed in parallel relation with said first scoring edge.

27. The scoring tool of claim 22, wherein said handle has a lock element engagable with said moveable post.

28. The scoring tool of claim 22, further comprising an adjustment hub engaged with said moveable post.

* * * * *